3,051,759
ACETYLENIC ETHERS
William E. Parham, St. Paul, Minn., assignor to Regents of the University of Minnesota, Minneapolis, Minn., a corporation of Minnesota
No Drawing. Filed Aug. 13, 1956, Ser. No. 603,816
5 Claims. (Cl. 260—609)

This invention relates to a new class of acetylenic thioethers or substituted mercaptoacetylenes having the general formula:

R—S—C≡CH wherein R is any monovalent alkyl, aryl, aralkyl or alicyclic radical. The invention also relates to a method of synthesis of acetylenic thioethers.

Acetylenic ethers and thioethers are useful intermediates in chemical synthesis. Ethoxyacetylene has proved to be a useful reagent for the conversion of ketones to acetylenic carbinols:

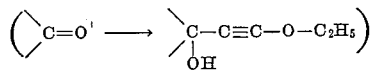

which can be converted into alpha, beta-unsaturated aldehydes, esters and acids:

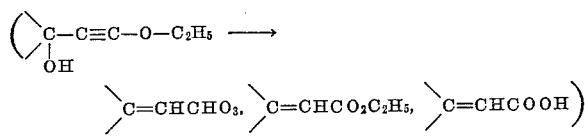

These processes are described by Heilbron, Jones, Julia and Weedon, J. Chem. Soc., 1949, 1823. It has been used in the synthesis of vitamin A aldehyde described by Van Dorp and Arens, natur, 160, 189 (1947), and in the preparation of an intermediate in one of the total syntheses of cortisone by Sarett, Arth, Lukes, Beyler, Poos, Johns and Constantine, J. Am. Chem. Soc., 74, 4974 (1952). Substituted mercaptoacetylenes serve as useful intermediates in chemical synthesis in the same manner as do the oxygen analogs.

It is the principal object of this invention to provide a new class of compounds, substituted mercaptoacetylenes.

A further object of this invention is to provide a method of synthesis for mercaptoacetylenes.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly speaking, the method of this invention comprises treating an ethylenic compound of the general formula:

R—S—CH=CH—S—R

Wherein R is any monovalent alkyl, aryl, aralkyl or alicyclic radical, with butyl lithium ($C_4H_9Li$) in an inert volatile organic solvent non-miscible with water while maintained at a relatively low temperature, adding water to separate the water-soluble reaction products, separating the aqueous and non-aqueous layers and distilling the latter to recover the acetylenic thioether from the organic solvent. The product has the general formula:

R—S—C≡CH wherein R is any monovalent alkyl, aryl, aralkyl or alicyclic radical and is a new class of chemical compounds.

Any of a vast number of monovalent alkyl, aryl, aralkyl and alicyclic radicals may be substituted in the general formula of the ethlenic starting material to produce the corresponding acetylenic ether, among which may be mentioned methyl, ethyl, propyl, butyl, amyl, hexyl, heptyl, octyl, nonyl, decyl, undecyl, dodecyl, tridecyl, cetyl, etc.; phenyl, tolyl, xylyl, cumenyl, naphthyl, etc.; benzyl, naphthobenzyl, mesityl, phenethyl, etc.; cyclopropyl, cyclobutyl, cyclopentyl, cyclohexyl, etc.

The invention is illustrated by the following examples:

*Example I*

Phenylmercaptoacetylene ($C_6H_5S$—C≡) was prepared as follows: A solution of n-butyl lithium in ether (55 ml.) was prepared from lithium wire (1.65 g., 0.238 g. atom) and n-butyl bromide (14.10 g., 0.103 mole) by the procedure of Gilman described in "Organic Reactions," vol. 6, John Wiley and Sons, Inc., New York, 1951, p. 258 ff. Cis-1,2-bis-(phenylmercapto)-ethylene (ca. 2 g. in 5 ml. diethyl ether) was added dropwise, with stirring, to the cold (0° to 20° C.) solution of butyl lithium. The reaction mixture was then further cooled (−10° to −15° C.) and the major portion of the substituted ethylene (a total of 14.03 g., 0.0574 mole) was added dropwise. The resulting mixture was stirred for two hours at −10° C., then warmed to 0° C. and treated with water (40 ml. added dropwise). The mixture was stirred for two hours at room temperature and then for one-half hour at reflux temperature. The resulting aqueous layer and ether layer were processed separately.

The ether layer was dried ($MgSO_4$) and concentrated and the orange-yellow residue was distilled. The product (B.P. 78–79° C./7 mm., $n_D^{25}$ 1.5938) was yellow in color and turned red-brown almost immediately. The yield of phenylmercaptoacetylene was approximately 80%.

*Example II*

The preparation of p-tolylmercaptoacetylene ($CH_3C_6H_4S$—C≡H)

was as follows: A solution of n-butyl lithium was prepared as described in Example I. The identical procedure described for the preparation of phenylmercaptoacetylene was then followed except that cis-bis-(p-tolylmercapto)-ethylene was used as the starting material. A total of 15.63 g. (0.0574 mole) of cis-bis-(p-tolylmercapto)-ethylene was used. The product was collected at B.P. 83–87° C./7 mm. The yield of p-tolylmercaptoacetylene was 62%.

*Example III*

Ethylmercaptoacetylene ($C_2H_5S$—C≡CH) was prepared using a total of 8.5g. (0.057 mole) of bis-(ethylmercapto)-ethylene as the starting material. The procedures of Example I were followed. The ethylmercaptoacetylene product was collected at 38–40° C./7 mm.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. The method of preparing substituted mercaptoacetylenes of the general formula:

R—S—C≡CH wherein R is any monovalent radical selected from the group consisting of alkyl, aryl, aralkyl and alicyclic radicals which comprises treating a mercaptoethylene of the general formula:

$$R-S-CH=CH-S-R$$

wherein R is as above specified, with butyl lithium in an inert volatile organic solvent.

2. The method according to claim 1 further characterized in that water is added to the reaction mass to separate the water soluble reaction products and the mercaptoacetylenes are recovered by distillation.

3. The method according to claim 1 further characterized in that R is a phenyl radical.

4. The method according to claim 1 further characterized in that R is a p-tolyl radical.

5. The method according to claim 1 further characterized in that R is an ethyl radical.

References Cited in the file of this patent

UNITED STATES PATENTS 2,412,814    Kendall et al.           Dec. 17, 1946
2,813,862    Arens                 Nov. 19, 1957

OTHER REFERENCES

Conant: Chemistry of Organic Compounds, page 269 (1934).

Jacobs et al.: J. Am. Chem. Soc. 62, pages 1849 to 1854 (1940).

Jacobs et al.: J. Am. Chem. Soc. 64, pages 223 to 226 (1942).

Lowey et al.: Introduction of Organic Chemistry, 7th Edition, (1951), page 215.

Truce et al.: Journal of the American Chemical Society, volume 78, February 5, 1956, pages 695 to 696.

Arens et al.: Rec. Trav. Chim. des Pays-Bas, May 1956, pages 481, 484 and 486.

UNITED STATES PATENT OFFICE
CERTIFICATE OF CORRECTION

Patent No. 3,051,759                  August 28, 1962

William E. Parham

It is hereby certified that error appears in the above numbered patent requiring correction and that the said Letters Patent should read as corrected below.

Column 2, line 16, for "$(C_6H_5S-C\equiv)$" read -- $(C_6H_5S-C\equiv CH)$ -- line 42, for "$(CH_3C_6H_4S-C\equiv H)$" read -- $(CH_3C_6H_4S-C\equiv CH)$ --.

Signed and sealed this 18th day of December 1962.

(SEAL)
Attest:

ERNEST W. SWIDER                      DAVID L. LADD
Attesting Officer                       Commissioner of Patents